May 15, 1962    R. W. HERR    3,034,259
BEAN VINE SUPPORT STRINGER
Filed Nov. 23, 1960    3 Sheets-Sheet 1

Roy W. Herr
INVENTOR.

May 15, 1962

R. W. HERR 3,034,259

BEAN VINE SUPPORT STRINGER

Filed Nov. 23, 1960

Roy W. Herr
INVENTOR.

BY Clarence A.O'Brien
and Harvey B. Jacobson
Attorneys

May 15, 1962

R. W. HERR 3,034,259

BEAN VINE SUPPORT STRINGER

Filed Nov. 23, 1960

Roy W. Herr
INVENTOR.

BY *Clarence A. O'Brien*
*and Harvey B. Jacobson*
Attorneys

United States Patent Office 3,034,259
Patented May 15, 1962

3,034,259
BEAN VINE SUPPORT STRINGER
Roy W. Herr, Rte. 2, Box 55, Silverton, Oreg.
Filed Nov. 23, 1960, Ser. No. 71,204
20 Claims. (Cl. 47—1)

The present invention relates to a machine which automatically erects a flexible type trellis on which vines may be supported for the growing of beans or the like.

In the growing of crops such as beans, which are characterized by vine type growth, it is customary to erect a flexible type trellis supported between spaced vertical bean poles which consists of an upper flexible wire rail and a lower paper twine rail with cotton string strung between the upper wire and lower twine in cross fashion to form therebetween a mesh-like structure sufficient for the support of the vine growth. Machines have heretofore been devised for the purpose of reducing the labor and time involved in the erection of such vine supporting trellis structures, which machines generally involved the use of rotating cotton spools for stringing the cotton between the upper wire and lower twine already erected and tacked to the bean poles by manual labor. The machines heretofore used have been characterized by frequent breakdowns and required frequent replacement of the cotton string spools which become immediately exhausted. The use of larger cotton spools has been impracticable because of the weight thereof and spatial extent thereof contributing to frequent breakdown of the machine.

It is therefore a primary object of this invention to provide a machine which will erect in a more completely automatic fashion a bean vine supporting trellis by stringing both the upper wire and lower twine, simultaneously with the stringing therebetween of the cotton forming the vine supporting mesh.

Another object of this invention is to provide a machine for erecting a vine supporting trellis capable of utilizing stringing cotton spools of larger dimensions in a more practicable manner and therefore requiring less frequent replacement and hence less frequent interruption of the cotton stringing operation.

An additional object of this invention is to provide a machine which operates in a more efficient manner to both string the upper wire and lower twine of a vine supporting trellis and simultaneously string a cotton webbing therebetween.

A further object of this invention in accordance with the foregoing objects, is to provide a flexible trellis erecting machine attachable to a tractor-type vehicle which features a novel stringing action whereby an endless movable belt mounts a plurality of cotton stringing guide tubes which receive the cotton string from cotton spools mounted on a rotor which spools are rotatable about a rotational axis at a radial distance substantially less than the distance between the upper and lower ends of the endless belt so that the string may be strung between the upper wire and lower twine at the requisite speed and yet the spools may be rotated at a reduced speed relative thereto enabling the use of larger spools by virtue of the reduced centrifugal forces to which the spools will be subjected in view of the short radial distance of their mounting about the rotational axis and reduced speed. Accordingly, the endless belt mechanism will be driven at a higher rate of speed than the rotor mounting the cotton stringing spool. A power take-off from the tractor provides the rotational power to the stringing guide belt mechanism and the cotton stringing spool rotor. Accordingly, the stringing will proceed simultaneously with the withdrawal of the upper wire and lower twine from guide tubes mounted in fixed relation on the machine frame with the spacing of the stringing cotton being determined by the relative speed of the stringing guide and the forward movement of the machine. Accordingly, the amount of stringing cotton utilized may be more accurately regulated and reduced. As a result thereof, the present machine will contribute to both a tremendous saving in labor and material in the erection of vine supporting trellises as compared to methods and means heretofore used and will also produce a more uniform and superior trellis structure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a partial enlarged sectional view taken through a plane indicated by section line 5—5 in FIGURE 1.

Figure 1:
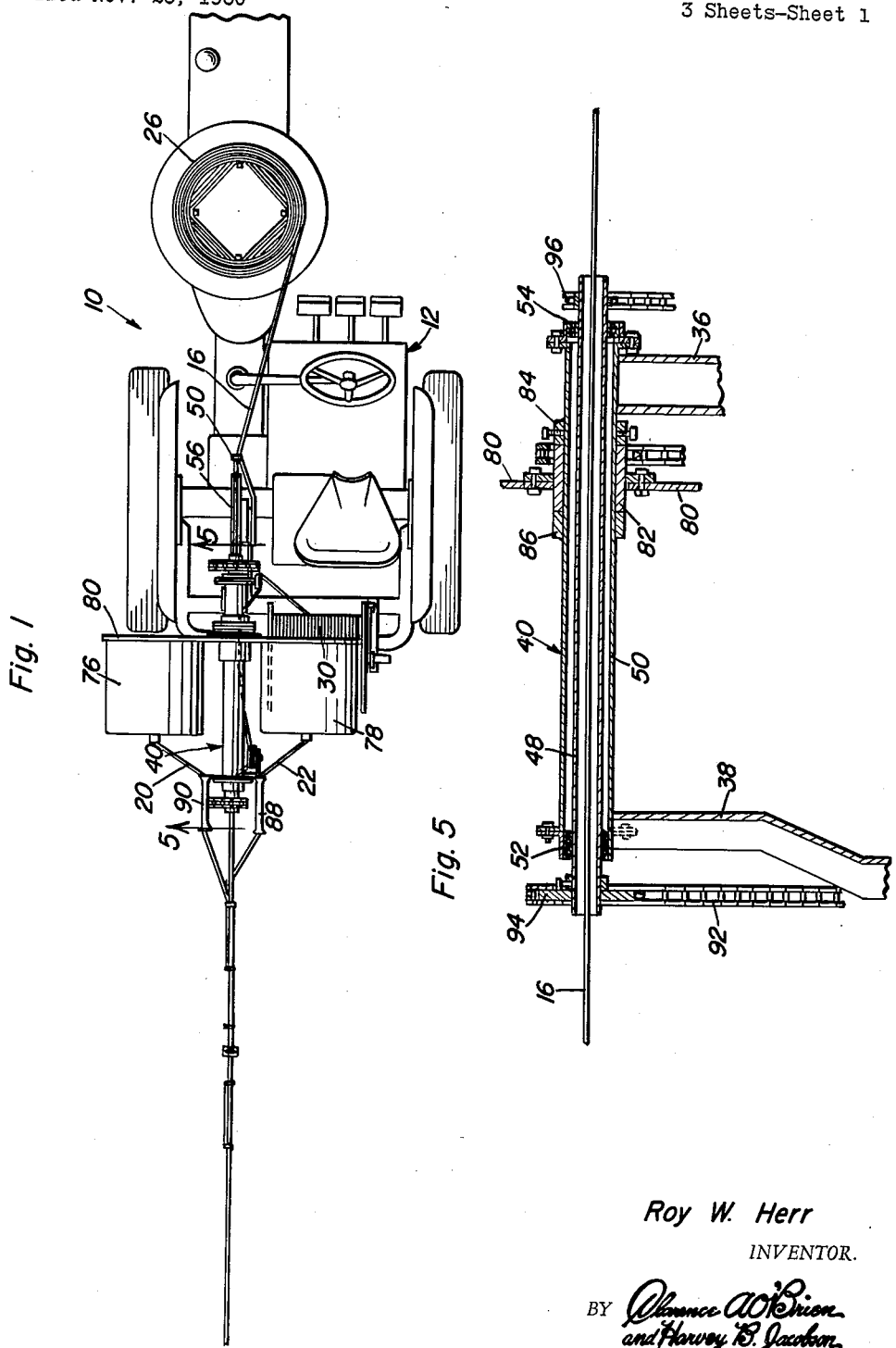
FIGURE 1 is a top plan view of the bean vine trellis stringing machine of this invention.
Figure 2:
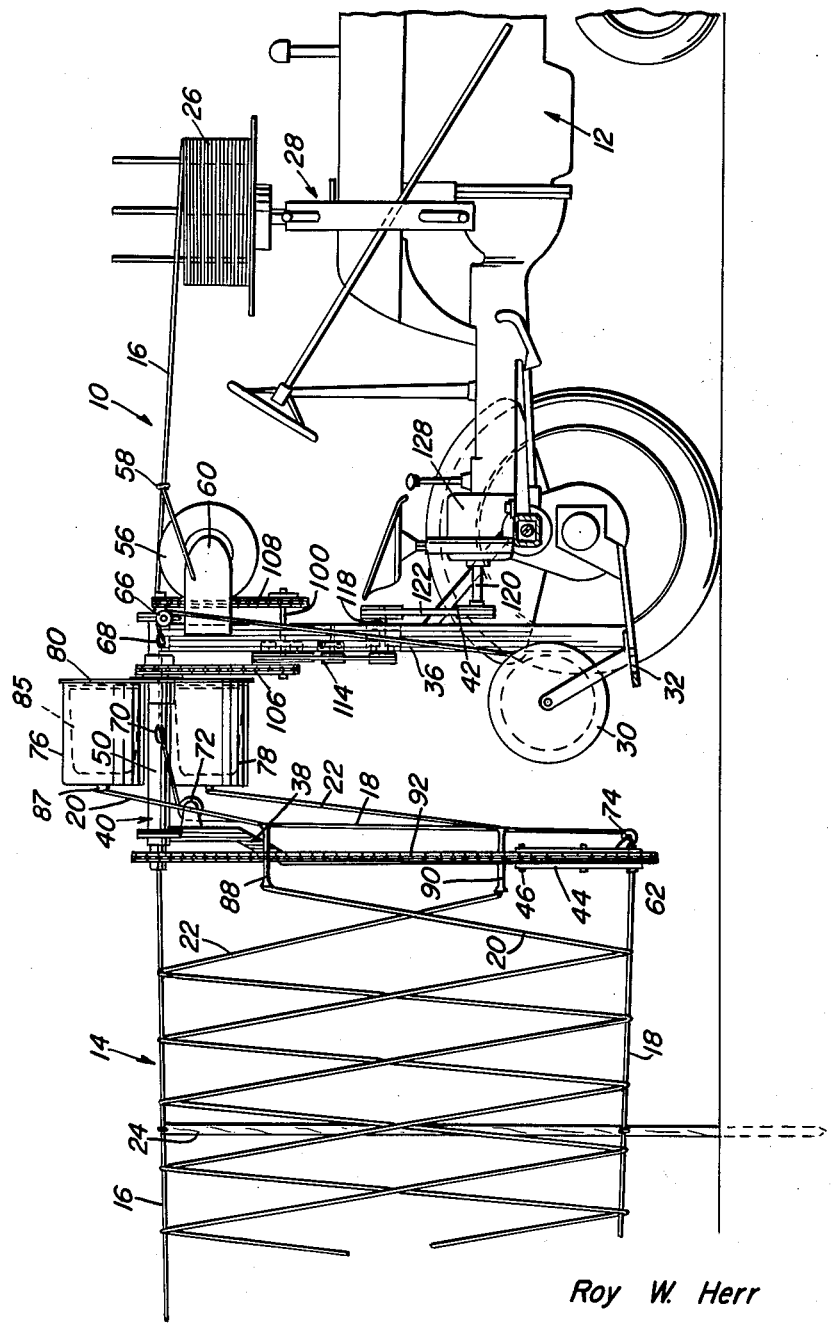
FIGURE 2 is a side elevational view of the machine illustrated in FIGURE 1.
Figure 3:
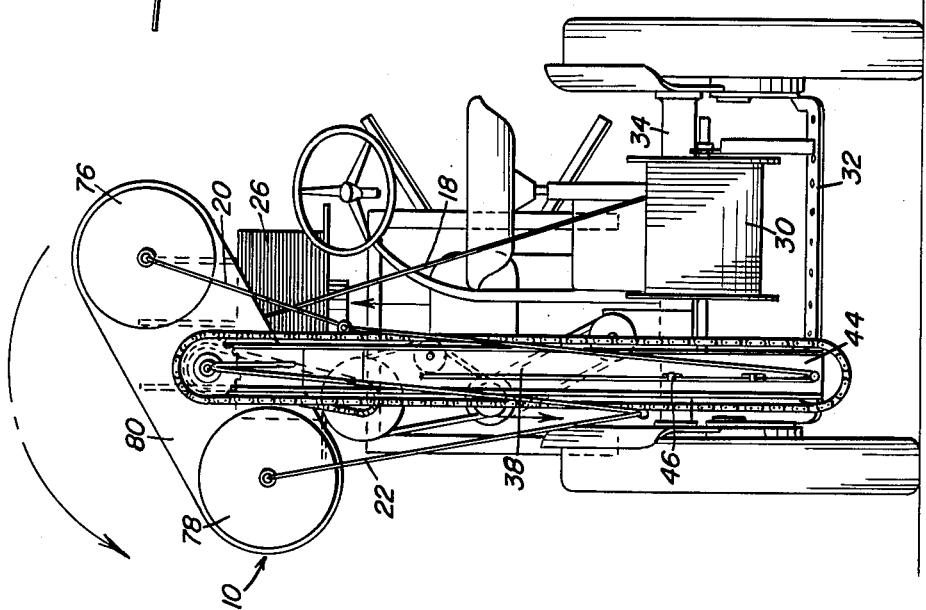
FIGURE 3 is a rear elevational view of the machine illustrated in FIGURES 1 and 2.

Referring now to the drawings in detail, FIGURES 1, 2 and 3 illustrate the machine of this invention which is generally referred to by reference numeral 10. It will be observed that the machine involves a tractor-type vehicle generally referred to by reference numeral 12 which may represent any conventional and suitable type of tractor upon which the novel structure constituting the machine 10 may be mounted. It will therefore be noted that the essential operating parts of the machine 10 project rearwardly of the tractor vehicle 12 in order to erect the flexible trellis structure generally referred to by reference numeral 14 as more clearly seen in FIGURE 2.

From FIGURE 2, it will be noted that the trellis structure 14 represents a structure commonly used for supporting vine growth and includes an upper flexible wire 16 which is withdrawn from the machine in response to forward movement thereof. Accordingly, the wire 16 will be connected to an anchoring pole at the starting end of the structure 14 so that it may be withdrawn from the machine 10 as it moves forward through the field. Similarly, a vertically spaced lower paper twine 18 forming the bottom rail of the trellis structure 14 is withdrawn from the machine 10 as it moves forwardly through the field. As shown in the exemplary illustration in FIGURE 2, two cotton strings 20 and 22 are strung between the wire 16 and twine 18 by the machine 10 in crossed relation to each other. The strings 20 and 22 thereby form the webbing between the wire 16 and twine 18 for support of the vine growth. Also illustrated in FIGURE 2, is a pole 24 which may be one of many intermediate poles that may be tacked both at the top to the wire 16 and adjacent to the bottom, to wire 18 after being set into the ground for intermediate support of the trellis structure 14 following the continuous erection thereof by the machine 10.

In order to string the upper rail wire 16 and lower rail twine 18, a wire containing spool assembly 26 is mounted above the tractor vehicle 12 by a mounting frame 28. The wire spool 26 is mounted therefore forwardly of the rear portion of the machine for supply thereto of the wire 16. The paper twine is supplied from a twine spool assembly 30 which is rotatably mounted on a frame assembly 32 fixed to the outer end of the tractor vehicle axle tube 34. The machine 10 also includes a pair of vertically disposed spaced frame assemblies 36 and 38. The frame assemblies 36 and 38 are aligned with each other and disposed to one lateral side of the tractor vehicle as more clearly seen in FIGURE 3. The frame assemblies 36 and 38 are also interconnected with each other by means of the guide tube structure 40 as more clearly seen in FIGURE 5 so that both of the frame assemblies 36 and 38 may be interconnected with each other and supported on the rear portion of the tractor vehicle 12 by the supporting frame 32 for the paper twine spool 30 and by additional bracing members 42. In connection with the frame assembly 38, it will be observed that at the lower portion thereof there is provided an adjustable section 44 by means of which the length of the frame assembly 38 may be varied by loosening and then retightening the slot mounted bolt fasteners 46.

The wire rail 16 is withdrawn from the machine 10 through the guide structure 40 which includes a hollow inner shaft member 48 through which the wire 16 extends as more clearly seen in FIGURE 5. The shaft 48 is rotatably mounted with respect to the outer fixed tube 50 by means of spaced bearings 52 and 54. The wire 16 which extends through the shaft 48 is received from the spool 26 and unwound therefrom in response to forward movement of the vehicle 12 and machine 10 with the end of the wire 16, not shown, being anchored on top of the anchoring post on which the trellis structure 14 is to be supported. The wire 16 before entering the guide tube structure 40 passes over the guide roller 56 and through the projecting eye member both of which are mounted on a forwardly projecting bracket member 60 connected to the frame assembly 36 as more clearly seen in FIGURES 1 and 2. The wire 16 is thereby continuously and properly guided into the guide tube structure 40.

Figure 4:
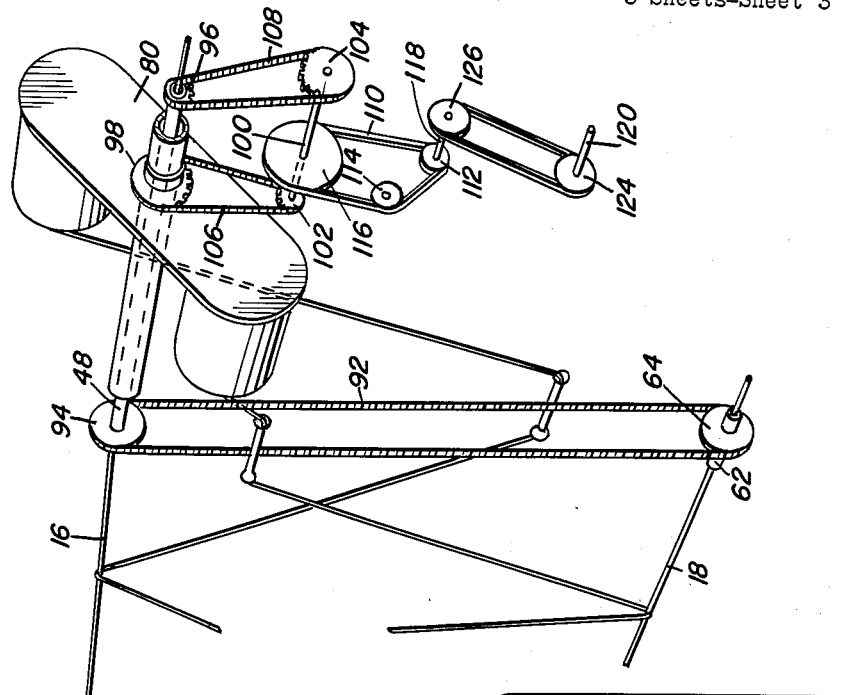
FIGURE 4 is a partial perspective view of the machine illustrating the drive mechanism and arrangement.

The lower paper twine 18 also anchored to the end anchoring post, not shown, is withdrawn through guide tube 62 which is mounted at the bottom end of the frame assembly 38 which guide tube 62 may constitute the mounting shaft for an idler sprocket wheel 64 as more clearly seen in FIGURE 4 for purposes as will hereafter become apparent. The twine 18 which is received from the spool 30 is guided into the guide tube 62 by means of a guiding pulley 66 mounted on the guide tube structure 40 on the side of the fixed tube portion 50 thereof adjacent the forward end of the fixed tube 50 so that the twine 18 may extend upwardly from the spool 30 about the guide pulley 66 and therefrom extend horizontally through apertures 68 and 70 in the side of the fixed guide tube 50. The twine 18 then extends from the aperture 70 in the guide tube 50 and is guided about the pulley 72 rotatably mounted by the frame assembly 38 so that the twine may extend downwardly therefrom and guided into the guide tube shaft 62 by means of the guide pulley 74 rotatably mounted adjacent the lower end of the frame assembly 38 on the forward side thereof as more clearly seen in FIGURE 2. The twine 18 may thereby be fed from the spool 30 to the guide tube 62 without interfering with any of the rotating parts of machine 10.

In order to supply the cotton strings 20 and 22 for stringing between the wire 16 and twine 18, a pair of cotton string spool assemblies 76 and 78 are provided which spool assemblies are mounted on a rotor 80. The rotor 80 is rotatable about the fixed tube 50 of the guide tube structure 40 by means of a hub 82 fixed to the rotor 80 as more clearly seen in FIGURE 5. Axial spacer elements 84 and 86 are therefore fixed to the fixed tube 50 whereby the hub 82 of the rotor 80 may be axially positioned thereon. It will be noted from FIGURE 2, each of the spool assemblies 76 and 78 have mounted therein a cotton string spool 85 as shown in dotted line from which the string is withdrawn through a sleeve element 87 fixed to the spool containing assembly. The string 20 is thereby fed from the assembly 76 while string 22 will be fed from the spool assembly 78.

In order to string the cotton strings 20 and 22 about the wire 16 and twine 18, a pair of stringing guide tubes 88 and 90 as more clearly seen in FIGURES 1, 2 and 4 are movably mounted with respect to the frame assembly 38 by means of endless drive chain belt 92 to which the guide tubes 88 and 90 are fastened. Accordingly, a drive sprocket wheel 94 is fixed to the rear end of the tube shaft 48 for driving the drive belt 92 entrained thereabout with the lower end of the drive belt 92 being trained about the sprocket wheel 66 which is mounted on the shaft guide tube 62 as hereinbefore indicated. It will therefore be apparent that rotation of the drive sprocket 94 will cause movement of the belt 92 and the stringing guide tubes connected thereto between the upper wire 16 and lower twine 18. Accordingly, the cotton strings 20 and 22 received within the stringing guide tubes 88 and 90 will be carried thereby about the wire 16 and twine 18 in order to form the webbing between the wire and twine as indicated in FIGURE 2. The spacing of the webbing will of course be determined by the speed of forward movement of the machine 10. Accordingly, the drive belt 92 must be moved at a relatively rapid rate of speed in order to string the wire with the proper tension and spacing between the wire 16 and twine 18. It will however be noted that the spool assemblies 76 and 78 which respectively feed the cotton string to the guide tubes 88 and 90 must rotate on the rotor 80 at such a speed relative to the speed of the belt 92 that the spool assemblies will at all times be angularly aligned with the guide tubes with respect to the rotational axis of the rotor 80. For example the spool assembly 76 must be at its highest position with respect to the rotational axis when the guide tube 88 with which it is associated through the string 20 is at the extreme upper end of the belt 92. When the spool assembly 76 is at its lowermost position with respect to the rotational axis of the rotor 80, the guide tube 88 must be at its lowermost position. It will therefore be apparent that the linear speed of the guide tube will be much greater than that of the cotton spool in order to maintain the angular phase relationship hereinabove indicated. Accordingly, a much slower speed of movement must necessarily be imparted to the rotor 80 and the cotton spool assemblies mounted thereon enabling the use of much larger spools and hence less frequent replacement made practical because of the reduced centrifugal forces to which the spool assemblies and spools will be subjected.

Drive mechanism will accordingly be required for imparting movement to both the guide tube mounting belt mechanism 92 and the rotor 80 for the cotton spool assemblies, which drive mechanism will necessarily cause movement of the rotor 80 at the proper slower speed as compared to the belt 92 in order to maintain the heretofore indicated angular phase relationship therebetween for properly stringing the cotton string. Referring therefore to FIGURE 4 in particular it will be observed that the shaft 48 connected to the drive sprocket 94 has connected thereto at its end opposite the drive sprocket 94 a driven sprocket gear 96 while the rotor 80 has connected thereto through the hub 82 the rotor driving sprocket gear 98. The shaft 48 and the rotor 80 may thereby be driven at a proper relative speed by means of the shaft 100 to which sprocket gears 102 and 104 are connected which sprocket gears are respectively drivingly connected to the rotor sprocket 98 and shaft sprocket 96 by drive belts 106 and 108. The shaft 100 is driven by means of a belt 110 which is trained about a drive pulley 112, idler pulley 114 and the driven pulley 116 connected to the shaft 100. An input shaft 118 is connected to the drive pulley 112 and is driven by the tractor power take-off shaft 120 by means of the belt 122 entrained about pulley wheel 124 connected to the power take-off shaft 120 and the pulley wheel 126 connected to the input shaft 118. As will be more clearly seen from FIGURE 2, the shafts 118 and 100 as well as the idler pulley wheel 114 are rotatably mounted by the frame assembly 36 in proper spaced relationship to the power take-off shaft 120 which extends rearwardly from the tractor transmission box 128.

From the foregoing description, operation and utility of the novel machine of this invention will be apparent. It will also be understood that the number of stringing guide tubes must necessarily correspond to the number of cotton string spool assemblies. Although two such pairs of guide tubes and cotton spool assemblies are illustrated, it should also be understood that any number of such pairs of guide tubes and cotton spool assemblies may be utilized pursuant to the principles of this invention. Accordingly, one, two, three or more guide tubes or spools may be used as desired depending on the amount of webbing desired between the wire and the twine rails of the trellis structure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bean pole stringing machine comprising frame means, spaced guide means mounted in fixed relation on the frame means from which vertically spaced flexible trellis rail means are withdrawn in response to forward movement of the frame means, and stringing means movably mounted by the frame means for stringing flexible string between the spaced flexible rail means in timed relation to withdrawal of the rail means from the guide means, said stringing means comprising movably mounted string containing spool means, movably mounted string guide means through which string from the spool means is withdrawn and carried over and between the spaced rail means and drive means operatively connected to the spool means and string guide means for moving the spool means at a slow rate of speed as compared to the moving string guide means whereby stringing may be accomplished at the requisite speed with slow moving and larger spools thereby subjected to reduced centrifugal forces.

2. A bean pole stringing machine comprising frame means, upper and lower rail guide means mounted in fixed relation on the frame means, wire and twine spool means rotatably mounted by the frame means for supplying wire and twine to the upper and lower guide means for withdrawal therefrom in response to forward movement of the frame means, string spool means rotatably mounted by the frame means for movement at a radial distance from a rotational axis which is always substantially less than half the distance between the lower and upper rail guide means, stringing guide means movably mounted by the frame means for movement between the lower and upper guide means to receive string from the string spool means for stringing between the wire and twine in response to movement of the stringing guide means and string spool means and driving means drivingly connected to the string spool means and the stringing guide means for respective movement thereof at different speeds.

3. The combination of claim 2, wherein the string spool means and stringing guide means are always angularly aligned with each other with respect to said rotational axis.

4. The combination of claim 3, wherein said driving means drives said string spool means and stringing guide means at different linear speeds but at the same rotational speed with respect to said rotational axis.

5. The combination of claim 4, wherein said rotational axis is aligned with the upper guide means.

6. The combination of claim 5, wherein said stringing guide means is movably mounted by an endless drive belt means extending between said lower and upper guide means and drivingly connected to the driving means at its upper end.

7. The combination of claim 6, wherein said driving means comprises drive shaft means rotatably mounted by the frame means about said rotational axis, drive sprocket means connected to one end of the shaft means for driving the drive belt means, driven gear means connected to the shaft means at its opposite end, string spool drive means rotatably mounted on the shaft means intermediate the ends thereof and power input means drivingly connected to the driven gear means and string spool drive means.

8. The combination of claim 2, wherein said stringing guide means is movably mounted by an endless drive belt means extending between said lower and upper guide means and drivingly connected to the driving means at its upper end, 9. The combination of claim 8, wherein said driving means comprises drive shaft means rotatably mounted by the frame means about said rotational axis, drive sprocket means connected to one end of the shaft means for driving the drive belt means, driven gear means connected to the shaft means at its opposite end, string spool drive means rotatably mounted on the shaft means intermediate the ends thereof and power input means drivingly connected to the driven gear means and string spool drive means.

10. The combination of claim 2 wherein said driving means drives said string spool means and stringing guide means at different linear speeds but at the same rotational speed with respect to said rotational axis.

11. The combination of claim 2, wherein said rotational axis is aligned with the upper guide means.

12. The combination of claim 2, wherein said stringing guide means and string spool means respectively include an equal number of guide tubes and spool assemblies.

13. The combination of claim 12, wherein the string spool means and stringing guide means are always angularly aligned with each other with respect to said rotational axis.

14. The combination of claim 1, wherein said drive means drives said string spool means and string guide means at different linear speeds but at the same rotational speed with respect to a rotational axis of said drive means.

15. The combination of claim 14, wherein said string spool means includes a plurality of spool assemblies and said string guide means includes a plurality of guide assemblies equal in number to said spool assemblies.

16. The combination of claim 1, wherein said string spool means includes a plurality of spool assemblies and said string guide means includes a plurality of guide assemblies equal in number to said spool assemblies.

17. A bean pole stringing machine comprising, frame means, means mounted on the frame means from which vertically spaced rails are withdrawn in response to forward movement of the frame means, string spool means movably mounted on the frame means, stringing guide means movably mounted on the frame means through which string from the string spool means is withdrawn for stringing between said vertically spaced rails in timed relation to said withdrawal of the rails and driving means operatively connected to the string spool means and stringing guide means for moving the spool means at a slow rate of speed as compared to the moving stringing guide means.

18. The combination of claim 17, wherein the string spool means and stringing guide means are always angularly aligned with each other with respect to a rotational axis of the driving means.

19. The combination of claim 18, wherein said driving means drives said string spool means and stringing guide means at different linear speeds but at the same rotational speed with respect to said rotational axis.

20. The combination of claim 17, wherein said driving means drives said string spool means and stringing guide means at different linear speeds but at the same rotational speed with respect to a rotational axis of said driving means.

References Cited in the file of this patent

UNITED STATES PATENTS

| | | |
|---|---|---|
| 2,541,302 | Slangal | Feb. 13, 1951 |
| 2,547,352 | Wiemers | Apr. 3, 1951 |
| 2,641,084 | Estes | June 9, 1953 |
| 2,753,661 | Wiemers | July 10, 1956 |